United States Patent
Naruse et al.

(10) Patent No.: US 9,501,035 B2
(45) Date of Patent: Nov. 22, 2016

(54) IMAGE FORMING APPARATUS

(71) Applicant: KYOCERA Document Solutions Inc., Osaka (JP)

(72) Inventors: Kentaro Naruse, Osaka (JP); Rie Tezuka, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 14/329,825

(22) Filed: Jul. 11, 2014

(65) Prior Publication Data
US 2015/0037056 A1 Feb. 5, 2015

(30) Foreign Application Priority Data
Jul. 31, 2013 (JP) .................... 2013-159046

(51) Int. Cl.
*G03G 21/20* (2006.01)
*G01J 5/12* (2006.01)
*G01J 5/02* (2006.01)
(Continued)

(52) U.S. Cl.
CPC .............. *G03G 21/20* (2013.01); *G01J 5/0022* (2013.01); *G01J 5/026* (2013.01); *G01J 5/12* (2013.01); *G01J 5/0809* (2013.01); *G01J 2005/0033* (2013.01); *G01J 2005/123* (2013.01)

(58) Field of Classification Search
CPC ...................... G03G 15/2039; G03G 15/2078; G01J 5/12; G01J 5/026; G01J 5/0022; G01J 5/0809
USPC ....................................................... 399/44, 69
See application file for complete search history.

(56) References Cited

U.S. PATENT DOCUMENTS

| 4,375,034 A | 2/1983 | Guscott |
| 8,702,372 B2 * | 4/2014 | Ansari et al. ...................... 415/1 |

(Continued)

FOREIGN PATENT DOCUMENTS

| JP | 64-066588 A | 3/1989 |
| JP | H03-58050 B2 | 9/1991 |

(Continued)

OTHER PUBLICATIONS

Notice of rejection mailed by Japan patent Office on Jul. 7, 2015 in the corresponding Japanese patent application No. 2013-159046.

*Primary Examiner* — Walter L Lindsay, Jr.
*Assistant Examiner* — Philip Marcus T Fadul
(74) *Attorney, Agent, or Firm* — IP Business Solutions, LLC (57) ABSTRACT

An electronic apparatus includes a thermopile array sensor, a reflector, and a temperature detection unit. The thermopile array sensor includes a plurality of thermopile elements arranged in a two-dimensional array pattern and a temperature detection surface divided into a plurality of predetermined regions aligned in vertical and horizontal directions, and the thermopile elements output a temperature detection signal corresponding to a temperature of the respective predetermined regions. The reflector is set at an angle to reflect infrared light emitted from a measurement point located outside of a viewing angle of the thermopile array sensor, so as to allow the infrared light to be incident on the temperature detection surface. The temperature detection unit detects the temperature on the basis of the temperature detection signal outputted from each of the thermopile elements. The thermopile array sensor and the reflector are located inside the electronic apparatus.

3 Claims, 7 Drawing Sheets

(51) Int. Cl.
*G01J 5/08* (2006.01)
*G01J 5/00* (2006.01)

(56) References Cited

U.S. PATENT DOCUMENTS

2010/0232822 A1* 9/2010 Takenaka ........... G03G 15/2053
                                                    399/69
2010/0322658 A1* 12/2010 Kikuchi et al. ................ 399/69
2012/0327458 A1* 12/2012 Baba et al. .................. 358/1.15
2013/0230074 A1    9/2013 Shin
2013/0235901 A1    9/2013 Shin
2014/0145081 A1*  5/2014 Schmidt ................ G01J 5/0025
                                                    250/338.3

FOREIGN PATENT DOCUMENTS

| | | |
|---|---|---|
| JP | 2003-229242 A | 8/2003 |
| JP | 2006-177848 A | 7/2006 |
| JP | 2013-543134 A | 11/2013 |
| WO | 2012/067423 A2 | 5/2012 |

* cited by examiner

IMAGE FORMING APPARATUS

INCORPORATION BY REFERENCE

This application claims priority to Japanese Patent Application No.2013-159046 filed on Jul. 31, 2013, the entire contents of which are incorporated by reference herein.

BACKGROUND

The present disclosure relates to an electronic apparatus and an image forming apparatus, and in particular to a technique of efficiently monitoring a temperature using a thermopile sensor.

Electronic apparatuses such as an image forming apparatus are configured to maintain the temperature of a fixing unit not lower than a predetermined level, so as to start executing a printing job within a reasonably short time upon receipt of a job instruction from a user. For this purpose, however, the fixing unit, which works at the final stage of the image forming process, consumes a largest amount of power, and therefore reduction in power consumption by the fixing unit is being positively studied, under the growing requirement for power saving. One of the attempts for power saving is implementing a human body detection function using a pyroelectric infrared sensor.

With the human body detection function, the apparatus can be switched to a sleep mode from a ready mode in a state where a human body is not detected, which prevents failure in turning off the apparatus, thus contributing to reducing power consumption. In this case, normally the display unit is turned off in the sleep mode, and therefore the apparatus is configured to turn on the display unit when a human body is detected by the human body detection function, for convenience to users. Although the mentioned configuration is just an example, such human body detection systems that utilize a low power-consumption infrared sensor having a wide detection region, such as a pyroelectric infrared sensor and a thermopile sensor, are widely employed. Arranging the thermopile elements in a two-dimensional array pattern leads to formation of a thermopile array sensor, which is capable of measuring two-dimensional thermal distribution of an object of measurement.

An example of the human body detection systems that employ the thermopile sensor is an apparatus that detects radiant heat from a human body with a thermopile and drives a predetermined load based on a DC detection output from the thermopile, to thereby detect presence of a human body.

SUMMARY

The disclosure proposes further improvement of the foregoing technique.

In an aspect, the disclosure provides an electronic apparatus including a thermopile array sensor, a reflector, and a temperature detection unit.

The thermopile array sensor includes a plurality of thermopile elements arranged in a two-dimensional array pattern and a temperature detection surface divided into a plurality of predetermined regions aligned in vertical and horizontal directions, and the thermopile elements output a temperature detection signal corresponding to a temperature of the respective predetermined regions.

The reflector is set at an angle to reflect infrared light emitted from a measurement point located outside of a viewing angle of the thermopile array sensor, so as to allow the infrared light to be incident on the temperature detection surface.

The temperature detection unit detects the temperature on the basis of the temperature detection signal outputted from each of the plurality of thermopile elements.

The thermopile array sensor and the reflector are located inside the electronic apparatus.

In another aspect, the disclosure provides an image forming apparatus including a thermopile array sensor, a reflector, a temperature detection unit, and a fixing unit.

The thermopile array sensor includes a plurality of thermopile elements arranged in a two-dimensional array pattern and a temperature detection surface divided into a plurality of predetermined regions aligned in vertical and horizontal directions, and the thermopile elements output a temperature detection signal corresponding to a temperature of the respective predetermined regions.

The reflector reflects infrared light so as to allow the infrared light to be incident on the temperature detection surface.

The temperature detection unit detects the temperature on the basis of the temperature detection signal outputted from each of the plurality of thermopile elements.

The fixing unit fixes a toner image formed on a recording medium, onto the recording medium with a heat roller and a pressure roller.

The plurality of predetermined regions are defined so as to respectively correspond to measurement points on the heat roller of the fixing unit aligned in an axial direction of the heat roller.

The reflector is set at an angle and a position that allow the infrared light emitted from each of the measurement points to be incident on the predetermined region corresponding to the measurement point.

The temperature detection unit detects the temperature of each of the measurement points on the basis of the temperature detection signal outputted from the thermopile element of the predetermined region corresponding to the measurement point.

DETAILED DESCRIPTION

Figure 1:
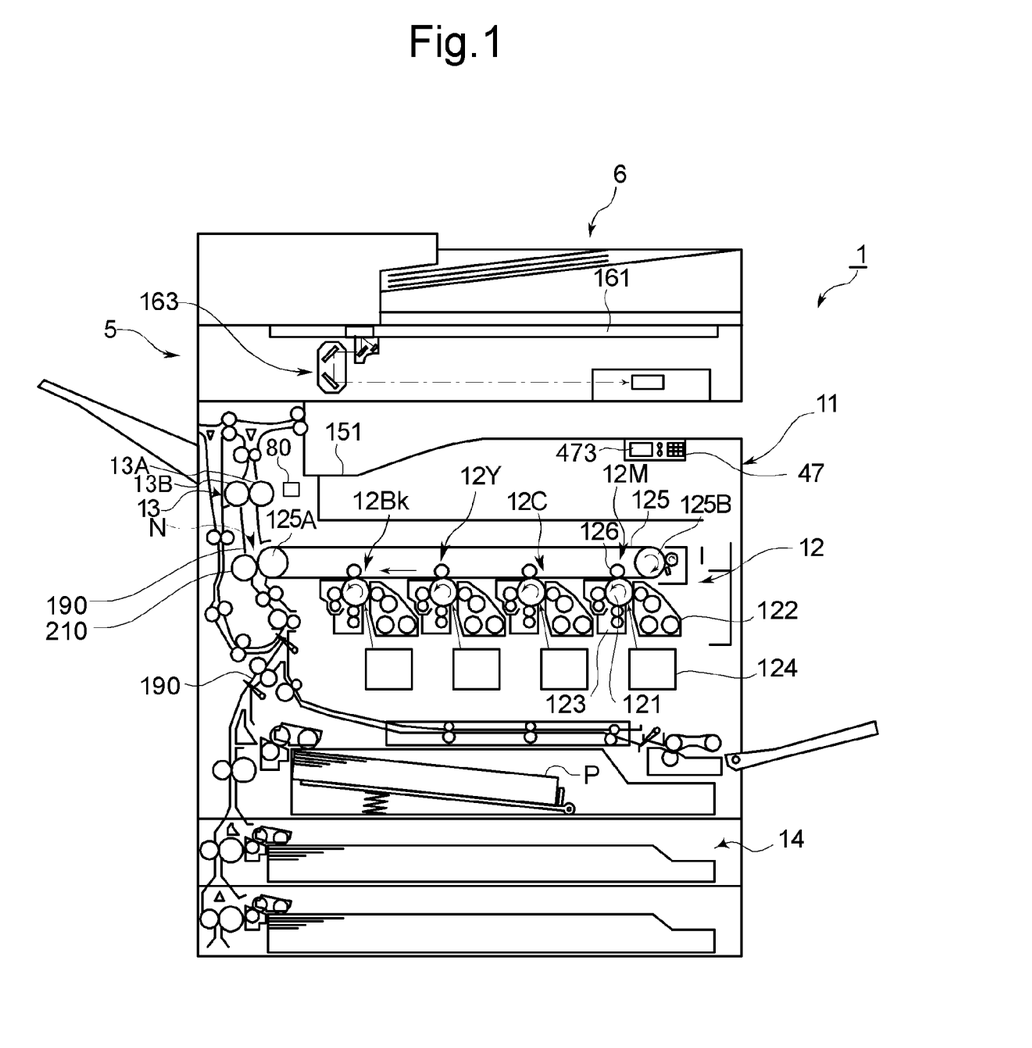
FIG. 1 is a front cross-sectional view showing a configuration of an image forming apparatus according to an embodiment of the disclosure.

Hereafter, an image forming apparatus according to an embodiment of the disclosure will be described with reference to the drawings. FIG. 1 is a front cross-sectional view showing a configuration of the image forming apparatus according to the embodiment of the disclosure.

The image forming apparatus 1 according to the embodiment of the disclosure is a multifunctional peripheral having a plurality of functions such as a copying function, a printing function, a scanning function, and a facsimile function. The image forming apparatus 1 includes a main body 11, in which an operation unit 47, an image forming unit 12, a fixing unit 13, a paper feed unit 14, a document feeding unit 6, and a document reading unit 5 are provided. The operation unit 47 includes a display unit 473 of a touch panel type that displays information such as an operation guidance for the operator, and also allows the operator to input an instruction and so forth by touching the touch panel.

When the image forming apparatus 1 performs the document reading operation, the document reading unit 5 optically reads the image on a source document fed by the document feeding unit 6 or placed on a platen glass 161, and generates image data. The image data generated by the document reading unit 5 is stored in a built-in HDD or a computer connected to a network.

When the image forming apparatus 1 performs the image forming operation, the image forming unit 12 forms a toner image based on the image data generated in the document reading operation or image data stored in the built-in HDD, on a recording sheet P exemplifying the recording medium in the disclosure delivered from the paper feed unit 14. The image forming subunits 12M, 12C, 12Y, and 12Bk of the image forming unit 12 each include a photoconductor drum 121, a charging unit 123, an exposure unit 124, a developing unit 122, and a primary transfer roller 126.

The respective developing unit 122 of each of the image forming subunits 12M, 12C, 12Y, and 12Bk includes therein a toner for developing a static latent image. The developing unit 122 supplies the toner to the surface of the photoconductor drum 121, which has undergone the charging by the charging unit 123 and the exposure by the exposure unit 124.

In the case of color printing, an image forming subunit 12M for magenta, an image forming subunit 12C for cyan, an image forming subunit 12Y for yellow, and an image forming subunit 12Bk for black in the image forming unit 12 each form the toner image on a photoconductor drum 121 based on the image data composed of the corresponding color component, through a charging, exposing, and developing processes, and a primary transfer roller 126 transfers the toner image onto an intermediate transfer belt 125.

The intermediate transfer belt 125, the primary transfer roller 126, the drive roller 125A, and the slave roller 125B are implemented in an intermediate transfer unit. The intermediate transfer belt 125 includes an image carrying surface formed on the outer circumferential surface, onto which the toner image is transferred, and is driven by the drive roller 125A, in contact with the circumferential surface of the photoconductor drum 121. The intermediate transfer belt 125 endlessly runs between the drive roller 125A and the slave roller 125B, in synchronization with the photoconductor drum 121.

The toner images of the respective colors are superposed at an adjusted timing when transferred onto the intermediate transfer belt 125, so as to form a colored toner image. A secondary transfer roller 210 transfers the colored toner image formed on the surface of the intermediate transfer belt 125 onto the paper sheet P transported along a transport route 190 from the paper feed unit 14, at a nip region N of a drive roller 125a engaged with the intermediate transfer belt 125. Then the fixing unit 13 fixes the toner image onto the paper sheet P by thermal pressing with a heat roller 13A and a pressure roller 13B. The paper sheet P having the colored image formed and fixed thereon is discharged to an output tray 151.

The main body 11 includes therein a thermopile array sensor 80 and at least one mirror (not shown), exemplifying the reflector in the disclosure. The thermopile array sensor 80 serves to detect, without contact, a temperature of a member in the image forming apparatus 1 the temperature of which has to be monitored, and is located close to the fixing unit 13 in the example shown in FIG. 1. The mirror serves to reflect infrared light emitted from a measurement point located outside of a viewing angle of the thermopile array sensor 80 and allow the infrared light to be incident on a predetermined region on the temperature detection surface of the thermopile array sensor 80.

Figure 2:
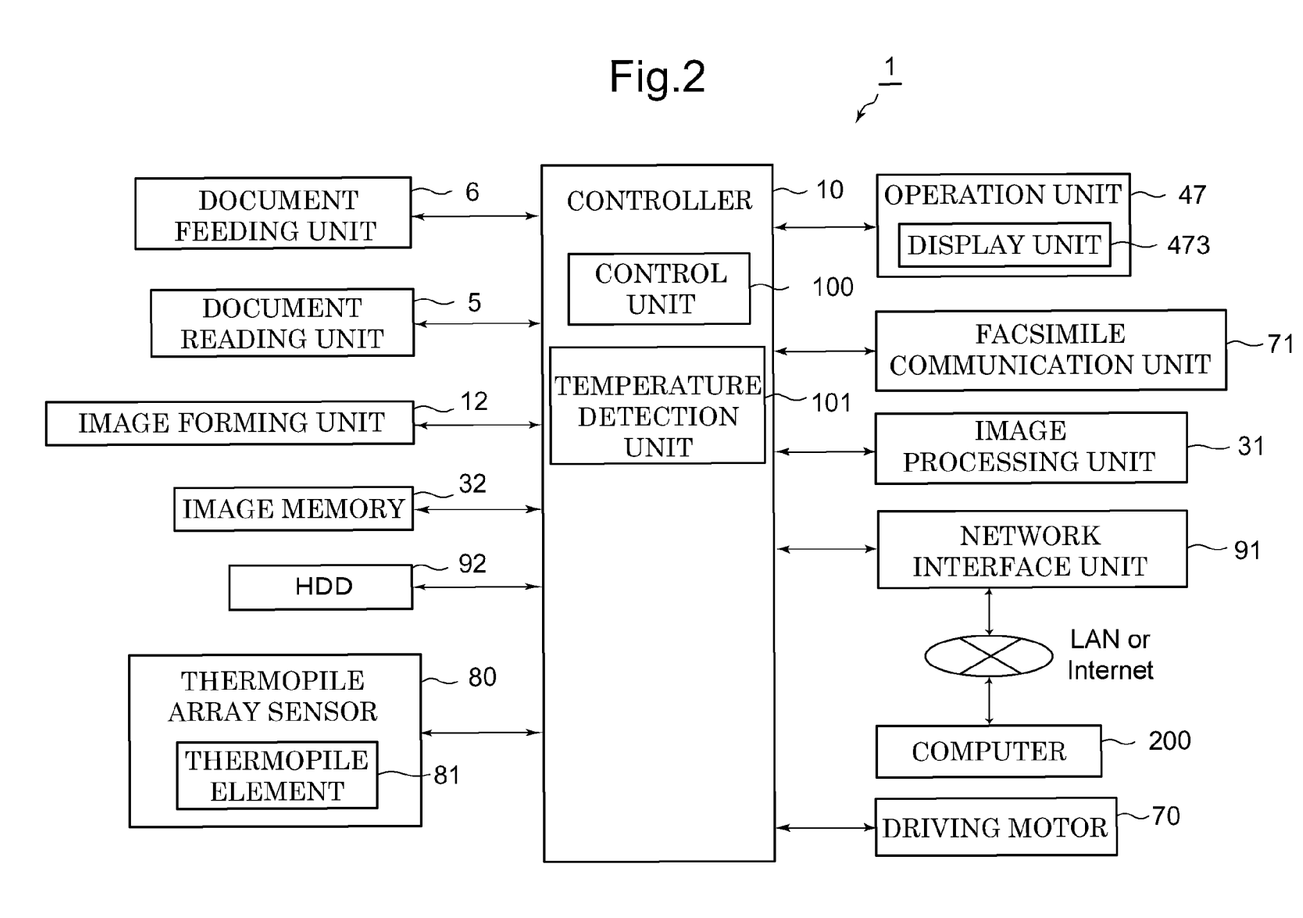
FIG. 2 is a functional block diagram showing essential internal constituents of the image forming apparatus according to the embodiment.

Hereunder, a configuration of the image forming apparatus 1 will be described. FIG. 2 is a functional block diagram showing essential internal constituents of the image forming apparatus 1.

The image forming apparatus 1 includes a controller 10. The controller 10 includes, though not shown, a central processing unit (CPU), a RAM, a ROM, and exclusive hardware circuits, and serves to manage the overall operation of the image forming apparatus 1.

The document reading unit 5 includes a reading mechanism 163 including a light emitter and a CCD sensor, to be controlled by the controller 10. The document reading unit 5 illuminates the source document with the light from the light emitter and detects the reflected light with the CCD sensor, to thereby read the image on the source document.

An image processing unit 31 processes the image data read by the document reading unit 5, as necessary. For example, the image processing unit 31 performs a predetermined image processing such as shading with respect to the image read by the document reading unit 5 so as to improve the quality of the image to be formed by the image forming unit 12.

An image memory 32 is a region for temporarily storing the image data of the source document acquired by the document reading unit 5, and data to be printed by the image forming unit 12.

The image forming unit 12 forms the image based on the image data acquired by the document reading unit 5, and print data received from a computer 200 connected to a network.

The operation unit 47 accepts instructions inputted by a user, with respect to the operations and processes that the image forming apparatus 1 is capable of performing. The operation unit 47 includes a display unit 473 of a touch panel type constituted of an LCD.

The display unit 473 displays, when the image forming apparatus 1 is in a normal operation mode, an operation screen, a preview screen, a printing job confirmation screen, and so forth. When the image forming apparatus 1 is in a sleep mode, the display unit 473 is turned off.

The facsimile communication unit 71 includes, though not shown, a coding/decoding unit, a modem unit, and a network control unit (NCU), and performs facsimile transmission through a public circuit.

A network interface unit 91 includes a communication module such as a LAN port, to transmit and receive data to and from the computer 200 in the local area, through the LAN connected to the network interface unit 91.

A hard disk drive (HDD) 92 is a large-capacity storage device for storing source image acquired by the document reading unit 5 and so on.

The thermopile array sensor 80 includes a plurality of thermopile elements 81 arranged in a two-dimensional array pattern. The thermopile elements each output a temperature detection signal corresponding to the temperature of one of a plurality of regions on a temperature detection surface divided in vertical and horizontal directions.

A driving motor 70 is a drive source that provides a rotational driving force to rotating components of the image forming unit 12 and transport roller pairs 19 except for the transport roller pairs 191, 192.

The controller 10 includes a control unit 100 and a temperature detection unit 101.

The control unit 100 serves to control the overall operation of the image forming apparatus 1. The control unit 100 is connected to the document reading unit 5, the document feeding unit 6, the image processing unit 31, the image memory 32, the image forming unit 12, the operation unit 47, the facsimile communication unit 71, the network interface unit 91, the HDD 92, the driving motor 60, and the toner sensor 120, and serves to control the operation of the cited functional units.

The temperature detection unit 101 receives the temperature detection signal outputted from each of the thermopile elements 81 of the thermopile array sensor 80, and calculates the temperature according to the temperature detection signal. For example, the temperature detection unit 101 may calculate the temperature on the basis of the value indicated by the temperature detection signal and a coefficient, or may contain a table showing a cross-reference between the value indicated by the temperature detection signal and the temperature, and read out the temperature corresponding to the value indicated by the temperature detection signal.

The temperature detection unit 101 also receives the temperature detection signal from the thermopile array sensor 80 with respect to each of predetermined regions on the temperature detection surface of the thermopile array sensor 80. Accordingly, the temperature detection unit 101 is capable of identifying which of the regions on the temperature detection surface the received temperature detection signal corresponds to. The temperature detection unit 101 detects the temperature on the basis of the temperature detection signal received from the thermopile array sensor 80 with respect to each of the predetermined regions defined on the temperature detection surface, thus detecting the temperature of the measurement points corresponding to the respective predetermined regions.

Figure 3:
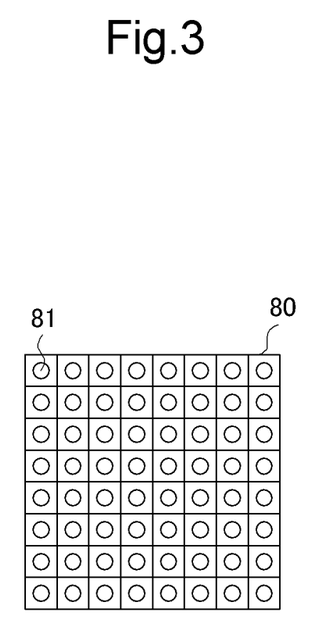
FIG. 3 is a schematic drawing showing a configuration of a thermopile array sensor according to the embodiment.

FIG. 3 illustrates a configuration of a thermopile array sensor 80 according to the embodiment. The thermopile array sensor 80 includes the plurality of thermopile elements 81 arranged in a two-dimensional array pattern. The thermopile array sensor 80 shown in FIG. 3 includes eight columns by eight rows, totally 64 pieces of thermopile elements 81 arranged in an array pattern. Infrared light is incident on each of the thermopile elements 81 arranged in the array pattern through a non-illustrated optical system and an infrared light transmission filter. The thermopile elements 81 each detect the temperature of the corresponding one of the regions divided in vertical and horizontal directions (8 columns by 8 rows, totally 64 regions in FIG. 3) on the temperature detection surface of the thermopile array sensor 80, and output an electrical signal based on the temperature detected, as the temperature detection signal.

Figure 4:
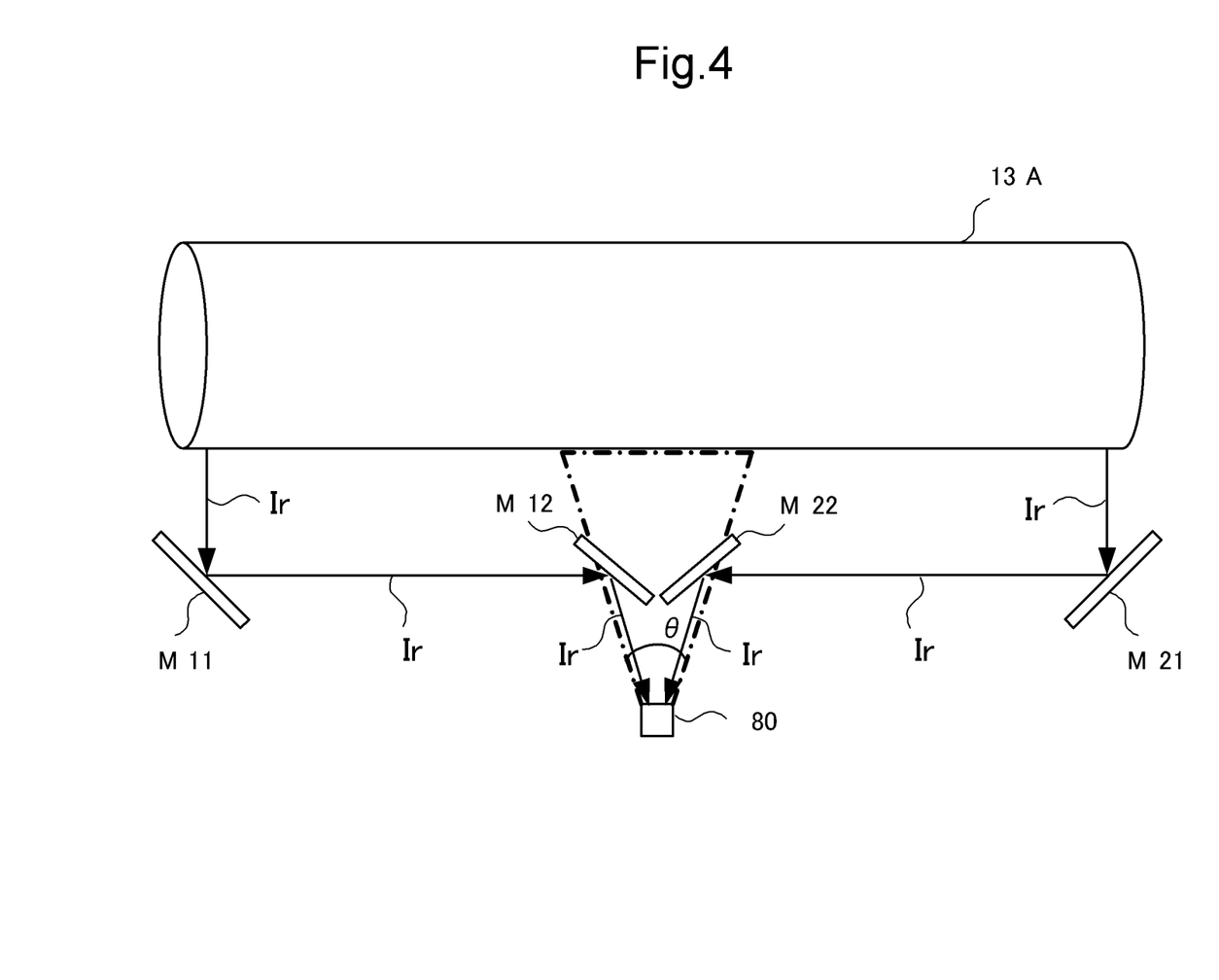
FIG. 4 is a schematic drawing showing a detection process of a temperature of predetermined points of a heat roller set in the axial direction, performed by the thermopile array sensor.

FIG. 4 is a drawing showing a detection process of a temperature of the both end portions of the heat roller 13A in the fixing unit 13, performed by the thermopile array sensor 80. The thermopile array sensor 80 is located in the vicinity of a central portion of the heat roller 13A, with the temperature detection surface oriented toward the heat roller 13A.

The viewing angle θ of the thermopile array sensor 80 is approximately 30 degrees in both vertical and horizontal directions, and the temperature detection surface is a square with four sides of approximately 5 to 6 cm at a point approximately 10 cm ahead. The resolution of the temperature detection surface is approximately 3 to 4 degrees, and the regions where the respective thermopile elements 81 detect the temperature are squares with four sides of approximately 6 to 7 cm at a point approximately 10 cm ahead. Since the viewing angle θ of the thermopile array sensor 80 is relatively narrow as mentioned above, the measurable range becomes smaller the shorter the measurement distance is. Accordingly, it is difficult to detect the temperature of the both end portions of the heat roller 13A at the same time with a single unit of thermopile array sensor 80. Although employing a plurality of thermopile sensors enables measurement of the temperature over a wider range, increasing the number of thermopile sensors naturally leads to an increase in manufacturing cost and size of the apparatus. Therefore, the image forming apparatus 1 according to this embodiment includes, in order to measure the temperature over a wider range with a single unit of thermopile array sensor 80 provided inside the apparatus without incurring an increase in manufacturing cost and size of the apparatus, mirrors M11, M12, M21, and M22 oriented in predetermined directions and located at predetermined points around the thermopile array sensor 80, so as to reflect infrared light Ir emitted from the both end portions of the heat roller 13A and allow the infrared light Ir to be incident on a region within the viewing angle θ of the thermopile array sensor 80.

As shown in FIG. 4, the thermopile array sensor 80 is opposed to a central portion of the heat roller 13A in the axial direction thereof. The mirror M11 is located at a point where the infrared light Ir emitted from one of the end portions of the heat roller 13A can be received, i.e., a point to closely oppose the one end portion of the heat roller 13A. The mirror M12 is located at a point shifted from the mirror M11 in the axial direction of the heat roller 13A to the vicinity of the thermopile array sensor 80, and ahead of the temperature detection surface of the thermopile array sensor 80. The mirror M11 has its reflecting surface oriented so as to reflect the infrared light Ir emitted from the one end portion of the heat roller 13A toward the mirror M12. The mirror M12 has its reflecting surface oriented so as to reflect the infrared light Ir reflected by the mirror M11, toward the temperature detection surface of the thermopile array sensor 80.

Likewise, the mirror M21 is located at a point where the infrared light Ir emitted from the other end portion of the heat roller 13A can be received, and reflects the infrared light Ir from the other end portion of the heat roller 13A toward the mirror M22. The mirror M22 is located at a point shifted from the mirror M21 in the axial direction of the heat roller 13A to the vicinity of the thermopile array sensor 80, so as to reflect the infrared light Ir reflected by the mirror M21, toward the temperature detection surface of the thermopile array sensor 80.

Thus, the set of the mirror M11 and the mirror M12 and the set of the mirror M21 and the mirror M22 allow the infrared light Ir emitted from the corresponding measurement points on the heat roller 13A aligned in the axial direction to be incident on the temperature detection surface of the thermopile array sensor 80. Here, though not specifically illustrated, providing additional sets of mirrors composed as above at desired points along the axial direction of the heat roller 13A enables the infrared light Ir emitted from the corresponding points along the axial direction to be incident on the temperature detection surface of the thermopile array sensor 80.

Figure 5:
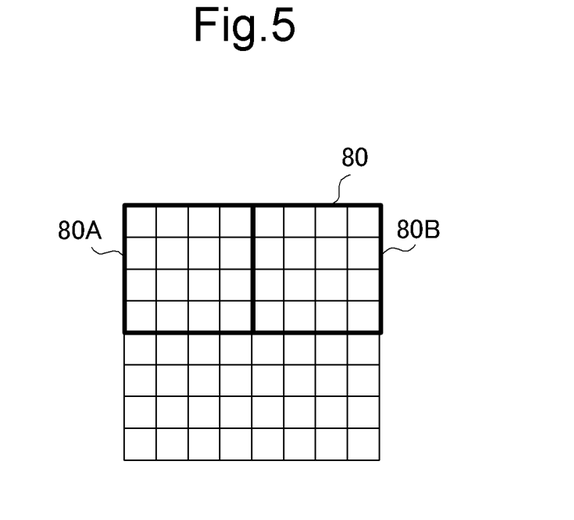
FIG. 5 is a schematic drawing showing an allocation example of temperature detection regions on the temperature detection surface of the thermopile array sensor, for detecting the temperature of the heat roller.

Hereunder, description will be given about the allocation of the temperature detection regions on the temperature detection surface of the thermopile array sensor 80, in the case of detecting the temperature of the predetermined points on the heat roller 13A aligned in the axial direction. FIG. 5 is a schematic drawing showing an allocation example of the temperature detection regions on the temperature detection surface of the thermopile array sensor 80, for detecting the temperature of the predetermined points on the heat roller 13A aligned in the axial direction.

For example, with respect to the thermopile array sensor 80, the infrared light Ir emitted from one end portion of the heat roller 13A and reflected by the set of mirrors M11, M12 may be made incident on a temperature detection region 80A composed of 4 columns by 4 rows, i.e., 16 pieces of thermopile elements 81, and the infrared light Ir emitted from the other end portion of the heat roller 13A and reflected by the set of mirrors M21, M22 may be made incident on a temperature detection region 80B composed of 4 columns by 4 rows, i.e., 16 pieces of other thermopile elements 81. Thus, the mirrors M12, M22 are each set at an angle that allows the infrared light Ir to be incident on the corresponding temperature detection region.

In addition, the infrared light Ir reflected by a different set of mirrors, composed similarly to the sets of mirrors M11, M12 and the mirrors M21, M22 and located at a different point on the heat roller 13A in the axial direction may be made incident on the remaining temperature detection region of the thermopile array sensor 80. Further, instead of providing the additional set of mirrors, the infrared light Ir emitted from the central portion of the heat roller 13A may be made incident on the remaining temperature detection region of the thermopile array sensor 80.

As described above, the temperature detection unit 101 detects the temperature on the basis of the temperature detection signal received from the thermopile array sensor 80 with respect to each of the regions on the temperature detection surface of the thermopile array sensor 80, to thereby enable the temperature of different points on the heat roller 13A to be detected at the same time with a single unit of thermopile array sensor 80.

In the case where a heat belt is employed in the fixing unit 13 instead of the heat roller 13A, the temperature of different points on the heat belt can be detected in the same manner as above, with a single unit of thermopile array sensor 80.

Figure 6:
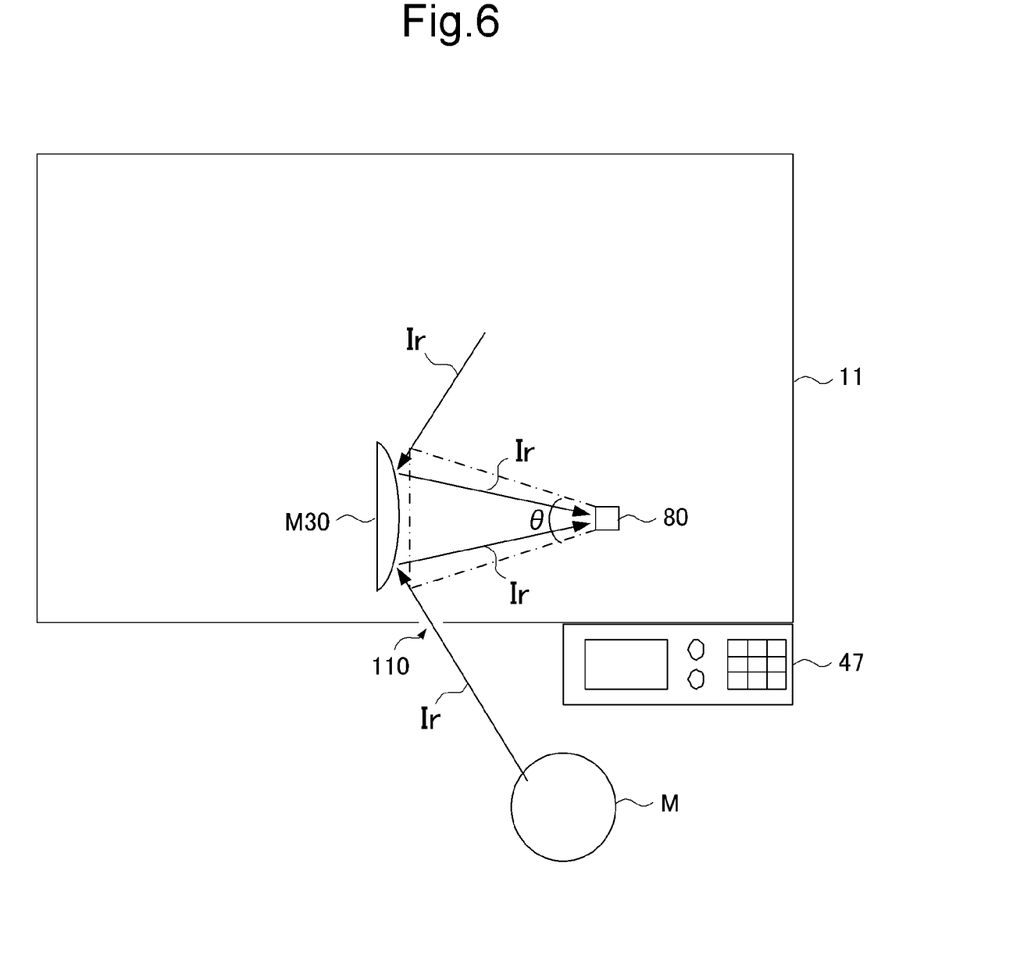
FIG. 6 is a schematic drawing showing a system for detecting a temperature inside and outside of the apparatus with the thermopile array sensor.

FIG. 6 is a schematic drawing of the main body 11 viewed from above, for explaining a system for detecting a temperature inside and outside of the image forming apparatus 1 with the thermopile array sensor 80.

In this case, the thermopile array sensor 80 is located inside the main body 11. Since the viewing angle θ of the thermopile array sensor 80 is relatively narrow as stated above, it is difficult to detect the temperature of inside and outside of the image forming apparatus 1 at the same time with a single unit of thermopile array sensor 80. Accordingly, a convex mirror M30 is provided in front of the thermopile array sensor 80, so as to allow the infrared light Ir emitted from inside and outside of the apparatus to be incident on a region within the viewing angle θ of the thermopile array sensor 80. The infrared light Ir from inside of the apparatus is reflected by the convex mirror M30 and made incident on a region within the viewing angle θ of the thermopile array sensor 80. The infrared light Ir from outside of the apparatus enters the main body 11 through an opening 110 formed in the casing constituting the outer shell of the image forming apparatus 1, and is reflected by the convex mirror M30 thus to be incident on a region within the viewing angle θ of the thermopile array sensor 80. Thus, the convex mirror 30 is located so as to oppose the temperature detection surface of the thermopile array sensor 80, at a point where the infrared light Ir from both inside and outside of the apparatus can be reflected toward a region within the viewing angle θ of the thermopile array sensor 80.

Alternatively, for example, the convex mirror M30 may be located ahead of the operation unit 47 of the image forming apparatus 1 so as to receive the infrared light Ir emitted from a predetermined point where an operator M is assumed to operate the operation unit 47. In this case, the thermopile array sensor 80 is able to detect both the temperature inside of the image forming apparatus 1 and the presence of the operator M approaching the image forming apparatus 1.

Figure 7:
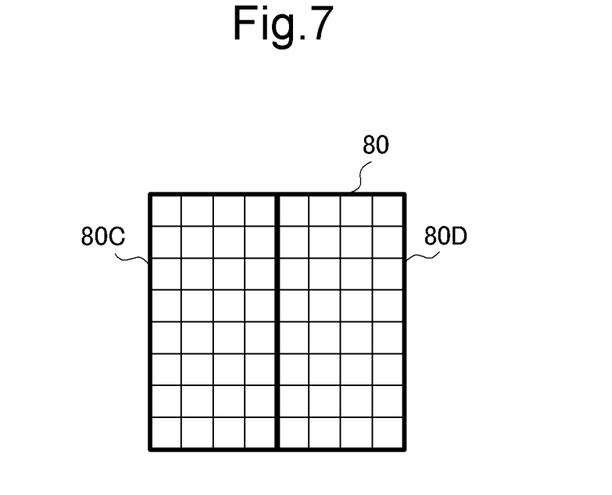
FIG. 7 is a schematic drawing showing an allocation example of the temperature detection regions on the temperature detection surface of the thermopile array sensor, for detecting the temperature inside and outside of the apparatus.

FIG. 7 is a schematic drawing showing an allocation example of the temperature detection regions on the temperature detection surface of the thermopile array sensor 80, for detecting the temperature inside and outside of the apparatus as above. With respect to the thermopile array sensor 80, for example, the infrared light Ir from inside of the apparatus may be made incident on a temperature detection region 80C composed of 32 pieces of thermopile elements 81, corresponding to a half of the temperature detection surface, and the infrared light Ir from outside of the apparatus may be made incident on a temperature detection region 80D composed of the remaining half, i.e., the remaining 32 pieces of thermopile elements 81.

As described above, the temperature inside and outside of the image forming apparatus 1 can be detected at the same time with a single unit of thermopile array sensor 80, by detecting the temperature on the basis of the temperature detection signal received from the thermopile array sensor 80 with respect to each of the temperature detection regions 80C, 80D.

Although the embodiment of the disclosure has been described in details as above, the disclosure may be modified in various manners without limitation to the foregoing embodiment. For example, the mirrors are employed as the reflectors in the foregoing embodiment. However, the reflector is not limited to a mirror but may be a reflecting plate formed of a different material, provided that the material is capable of reflecting infrared light.

Although the image forming apparatus according to the disclosure is exemplified by the multifunctional peripheral in the foregoing embodiment, the disclosure may be applied to a different image forming apparatus such as a printer, a copier, and a facsimile machine, or to an electronic apparatus other than the image forming apparatus.

Further, the specific configurations and processes described with reference to FIGS. 1 through 7 are merely exemplary embodiments of the disclosure, and the configurations and processes of the disclosure are in no way limited to those embodiments.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus comprising:
an image forming unit forming a toner image generated based on an image data, onto a recording medium;
a fixing unit fixing the toner image generated on the recording medium, onto the recording medium with a heat roller and a pressure roller;
a thermopile array sensor being located at a point opposed to a central portion of the heat roller, including a plurality of thermopile elements arranged in a two-dimensional array pattern, and a temperature detection surface divided into a plurality of predetermined regions aligned in vertical and horizontal directions, the thermopile elements being configured to output a temperature detection signal corresponding to a temperature of the respective predetermined regions;
reflectors including a first reflecting mirror located at a point opposed to a measurement point which is a part of the heat roller in the fixing unit and is a part outside of a viewing angle of the thermopile array sensor, and a second reflecting mirror located at a point shifted in the axial direction of the heat roller from the locational position of the first reflecting mirror and ahead of the temperature detection surface of the thermopile array sensor, each of the reflectors being configured to reflect, toward the axial direction of the heat roller with the first reflecting mirror, infrared light emitted from the measurement point so as to allow the reflected infrared light, with the second reflecting mirror, to be limitedly incident on the predetermined regions of the temperature detection surface; and
a temperature detection unit that detects the temperature on the basis of the temperature detection signal outputted from each of the plurality of thermopile elements,
wherein there are a plurality of the measurement points at different points in the axial direction of the heat roller, each of the measurement points respectively has one of the reflectors, and the predetermined regions on which each infrared light emitted from each of the measurement points are incident are respectively set to be different from each other at the every measurement points,
the thermopile array sensor is arranged at a position where the infrared light emitted from the measurement point is to be incident on temperature detection regions other than the predetermined regions of the temperature detection surface, and the measurement point is a part of the heat roller within the viewing angle of the thermopile array sensor,
the temperature detection unit detects the temperature of each of the measurement points respectively corresponding to the predetermined regions and the temperature detection regions on the basis of the temperature detection signal outputted from each of the thermopile elements arranged at the respective predetermined regions and the temperature detection regions,
the thermopile array sensor and the plurality the reflectors are located inside the image forming apparatus, and an angle of the first reflecting mirror is set to reflect the infrared light in a direction parallel to the axial direction of the heat roller.

2. The image forming apparatus according to claim 1, further comprising an opening formed in a casing constituting an outer shell of the image forming apparatus so as to allow infrared light from outside of the image forming apparatus to be introduced into the image forming apparatus,
wherein the reflectors further include convex mirrors that reflect: the infrared lights emitted from the inside of the image forming apparatus that are reflected by the first and the second reflecting mirrors; and the infrared lights incident on the inside of the image forming apparatus from the outside of the image forming apparatus, so as to allow the infrared lights to be incident on the predetermined regions of the temperature detection surface.

3. An image forming apparatus comprising:
an image forming unit forming a toner image generated based on an image data, onto a recording medium;
a fixing unit fixing the toner image generated on the recording medium, onto the recording medium with a heat roller and a pressure roller;
a thermopile array sensor being located at a point opposed to a central portion of the heat roller, including a plurality of thermopile elements arranged in a two-dimensional array pattern, and a temperature detection surface divided into a plurality of predetermined regions aligned in vertical and horizontal directions, the thermopile elements being configured to output a temperature detection signal corresponding to a temperature of the respective predetermined regions;
reflectors including a first reflecting mirror located at a point opposed to a measurement point which is a part of the heat roller in the fixing unit and is a part outside of a viewing angle of the thermopile array sensor, and a second reflecting mirror located at a point shifted in the axial direction of the heat roller from the locational position of the first reflecting mirror and ahead of the temperature detection surface of the thermopile array sensor, each of the reflectors being configured to reflect, toward the axial direction of the heat roller with the first reflecting mirror, infrared light emitted from the measurement point so as to allow the reflected infrared light, with the second reflecting mirror, to be limitedly incident on the predetermined regions of the temperature detection surface; and
a temperature detection unit that detects the temperature on the basis of the temperature detection signal outputted from each of the plurality of thermopile elements,
wherein there are a plurality of the measurement points at different points in the axial direction of the heat roller, each of the measurement points respectively has one of the reflectors, and the predetermined regions on which each infrared light emitted from each of the measurement points are incident are respectively set to be different from each other at the every measurement points,
the thermopile array sensor is arranged at a position where the infrared light emitted from the measurement point is to be incident on temperature detection regions other than the predetermined regions of the temperature detection surface, and the measurement point is a part of the heat roller within the viewing angle of the thermopile array sensor, the temperature detection unit detects the temperature of each of the measurement points respectively corresponding to the predetermined regions and the temperature detection regions on the basis of the temperature detection signal outputted from each of the thermopile elements arranged at the respective predetermined regions and the temperature detection regions, the thermopile array sensor and the plurality the reflectors are located inside the image forming apparatus, and the first reflecting mirror is at one longitudinal end of the heat roller, and the second reflecting mirror and the thermopile array sensor are at a center of the heat roller.

\* \* \* \* \*